(12) United States Patent
Lindemann et al.

(10) Patent No.: US 6,320,167 B1
(45) Date of Patent: Nov. 20, 2001

(54) SINTERED STICK-SHAPED HEATER

(75) Inventors: Gert Lindemann, Lichtenstein; Friederike Lindner, Gerlingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,522

(22) PCT Filed: Nov. 11, 1999

(86) PCT No.: PCT/DE99/03589

§ 371 Date: Oct. 25, 2000

§ 102(e) Date: Oct. 25, 2000

(87) PCT Pub. No.: WO00/34205

PCT Pub. Date: Jun. 15, 2000

(30) Foreign Application Priority Data

Dec. 4, 1998 (DE) .............................................. 198 60 919

(51) Int. Cl.[7] ...................................................... H05B 3/10
(52) U.S. Cl. .................... 219/553; 219/270; 219/548; 219/541
(58) Field of Search .................. 219/553, 270, 219/548, 505, 550, 551, 552

(56) References Cited

U.S. PATENT DOCUMENTS

| | | | |
|---|---|---|---|
| 4,634,837 | * | 1/1987 | Ito et al. ............................ 219/270 |
| 4,644,133 | * | 2/1987 | Atsumi et al. ..................... 219/270 |
| 4,814,581 | * | 3/1989 | Nunogaki et al. ................. 219/270 |
| 4,845,061 | * | 7/1989 | Inoguchi et al. .................... 501/97 |
| 5,004,893 | * | 4/1991 | Westover .......................... 219/505 |
| 5,146,536 | * | 9/1992 | Westover .......................... 392/488 |
| 5,753,893 | * | 5/1998 | Noda et al. ........................ 219/548 |

FOREIGN PATENT DOCUMENTS

| | | |
|---|---|---|
| 35 12 483 | 10/1985 | (DE) . |
| 35 19 437 | 12/1985 | (DE) . |
| 37 34 274 | 4/1988 | (DE) . |
| 197 22 321 | 12/1998 | (DE) . |
| 0 601 727 | 6/1994 | (EP) . |

* cited by examiner

*Primary Examiner*—Teresa Walberg
*Assistant Examiner*—Vinod D Patel
(74) *Attorney, Agent, or Firm*—Kenyon & Kenyon

(57) ABSTRACT

A sintered pin heater which is made of a ceramic composite structure and which has an essentially enclosed insulating layer and an external conducting layer. The insulating layer being obtainable from 51–57 mass percent of $Si_3N_4$, 37–42 mass percent of $MoSi_2$, 2.4–2.8 mass percent of $Al_2O_3$, and 3.2–3.6 mass percent of $Y_2O_3$. The conducting layer 13 obtainable from 38–42 mass percent of $Si_3N_4$, 53–58 mass percent of $MoSi_2$, 1.8–2.0 mass percent of $Al_2O_3$, and 2.4–2.7 mass percent of $Y_2O_3$.

7 Claims, 3 Drawing Sheets

SINTERED STICK-SHAPED HEATER

BACKGROUND INFORMATION

The present invention relates to a sintered pin heater which is made of a ceramic composite structure and which has an essentially enclosed insulating layer and an external conducting layer.

German Published Patent Application No. 35 12 483 describes a ceramic heating element made of $Si_3N_4/MoSi_2$ composites having a proportion of 35–75 mole percent of $Si_3N_4$, the average particle diameter of the used $Si_3N_4$ powder being twice as large as that of the used $MoSi_2$ powder. The average particle diameter of the $MoSi_2$ powder is 2 $\mu$m or smaller.

However, the utilization of this powder combination leads to satisfactory strengths only if an axial hot-pressing or a hot isostatic pressing process is used. However, this method has the disadvantage that a hard machining requiring considerable outlay must be carried out subsequently.

German Published Patent Application No. 35 19 437 describes an electrical, ceramic heating device, likewise using $Si_3N_4/MoSi_2$ powders, the electrically insulating part being made of powders whose average particle diameter is 1–50 $\mu$m. The conductive powder has the same or a larger average particle diameter than the insulating powder. The conductive part of the heating device is designed in such a manner that the electrically conductive powder is not larger than half the average size of the electrically insulating powder. In this case, as well as in German Published Patent Application No. 35 12 483, this powder combination leads to products having a sufficient strength only if an axial hot-pressing or a hot isostatic pressing process is used with the above-mentioned disadvantages.

German Patent No. 37 34 274 describes ceramic composites on the basis of silicon nitride, aluminum nitride, and β sialon in combination with secondary phases from different silicides, carbides, borides, and nitrides of transition-metal elements. Depending on the secondary phase content, these materials possess selectively adjustable electrical properties. The adjustable specific values for the electrical resistance of these materials at room temperature lie between $1 \cdot 10^{13}$ to $1 \cdot 10^{-4}$ $\Omega$cm and exhibit a positive dependence on the temperature (PTC effect). The strength level of these composites produced in this manner does not lie below 200 MPa. The method used there for manufacturing highly heat-resistant composites is to be considered a uniaxial hot-pressing which, in particular, has disadvantages with respect to the shaping of bodies manufactured from these composites, as mentioned above. Further disadvantages are that bodies made therewith can have anisotropic material properties because of the pressing direction and that the method is only usable as batch process, i.e., not as continuous process. Moreover, this method requires high temperatures and pressures.

Also described in German Patent No. 37 34 274 is the implementation of a ceramic heater or a sheathed-element glow plug using $Si_3N_4/MoSi_2$ composites having sintered-in metal wires as supply leads.

OBJECT AND ADVANTAGES OF THE INVENTION

The object of the present invention is to provide a pin heater having a high strength during whose manufacture a hard machining requiring considerable outlay can be omitted.

The object of the present invention is achieved by a sintered pin heater which is made of a ceramic composite structure and has an essentially enclosed insulating layer and an external conducting layer, the insulating layer being obtainable from 51–57 mass percent of $Si_3N_4$ with $d_{50}$ being preferably less than 0.7 $\mu$m, 37–42 mass percent of $MoSi_2$ with $d_{50}$ being preferably less than 2–5 $\mu$m, 2.4–2.8 mass percent of $Al_2O_3$ with $d_{50}$ being 0.2–0.3 $\mu$m, and 3.2–3.6 mass percent of $Y_2O_3$ with $d_{50}$ being preferably 0.5–1.0 $\mu$m, and the conducting layer being obtainable from 38–42 mass percent of $Si_3N_4$ with $d_{50}$ being preferably less than 0.7 $\mu$m, 53–58 mass percent of $MoSi_2$ with $d_{50}$ being preferably less than 2–5 $\mu$m, 1.8–2.0 mass percent of $Al_2O_3$ with $d_{50}$ being preferably 0.2–0.3 $\mu$m, and 2.4–2.7 mass percent of $Y_2O_3$ with $d_{50}$ being preferably 0.5–1.0 $\mu$m.

The electrically insulating material which forms the insulating layer has a specific electrical resistance of $10^5$–$10^6$. The electrically conductive material which forms the conducting layer has a specific electrical resistance of $1 \cdot 10^{-3}$–$5 \cdot 10^{-3}$ $\Omega$.

It is generally known that, apart from the concrete chemical composition of the composite materials, the electrical properties, are determined by the specific particle-size ratios of the used powders. With regard to both the used materials, their quantitative proportions, and in particular, due to their average particle diameter, the specific selection according to the present invention enables the manufacture of electrically insulating and electrically conducting composites which, subsequent to sintering, have a 4-point bending strength of at least 500 MPa at room temperature, and which remains nearly unchanged up to a temperature of 1000° C.

In particular, the use of the very fine, highly sinter-active $Si_3N_4$ raw material having an average particle diameter of less than 0.7 $\mu$m, and the use of the $MoSi_2$ raw material having an average particle diameter of 2–5 $\mu$m, for both manufacturing the electrically insulating material and the electrically conducting material, result in these particularly advantageous properties of the sintered pin heater.

Using the method described in German Published Patent Application No. 197 22 321, it is possible for combinations of these materials to be prepared, shaped and gas-pressure sintered. The sintering process is made up of at least two stages, the first sintering being carried out under inert gas, and the last sintering being carried out under a nitrogen partial pressure of $2$–$10 \cdot 10^5$ Pa, the temperature of the first sintering stage being lower than that of the last sintering stage. In this context, a pressure of atmospheric pressure and a maximum temperature of 900° C. is preferred in the first sintering stage. In the last sintering stage, a sintering temperature between 1700 and 1900° C. is preferred.

Moreover, the last sintering stage can be carried out at variable temperature and/or variable nitrogen partial pressure in such a manner that, in the constitution diagram, the ceramic composite structure contains the pure phases of the insulating component and of the conducting component.

Furthermore, the sintering can be carried out in a range of the nitrogen partial pressure having an upper limit $Y_1 = \log p (N_2)$ and a lower limit $Y_2 = \log p (N_2)$, where the upper limit $Y_1$ and the lower limit $Y_2$ are expressed according to the following functions:

$Y_1 = 7.1566 \ln(T) - 52.719$ and $Y_2 = 9.8279 \ln(T) - 73.988$,

T being the sintering temperature of $\leq 1900°$ C. and being input in ° C. In this context, the nitrogen partial pressure p ($N_2$) is indicated in bar.

For manufacturing the conducting composite component, powders are used which have the same morphological properties as the powders used for manufacturing the non-conducting composite component.

The two composite components are preconditioned by grinding in a mixing manner. Subsequently, injection-moldable polymer compounds made of the respective composite components are manufactured from a special polypropylene and cyclododecane, are kneaded under protective gas at high temperature and are granulated by cooling while continuously kneading. Using injection molding (CIM= ceramic injection molding), preferably using two-component injection molding, a ceramic body is formed from the polymer compound material which will constitute the conducting layer, and the other polymer compound material is injected subsequently in a second step.

In a first annealing step, the organic binder is removed (debindering), and a pre-sintering up to 900° C. under $10^5$ Pa nitrogen is carried out. The main sintering takes place under a defined $N_2$ partial pressure, which is varied with the temperature in such a manner that it lies within the range specified in claim 6. For example, argon can be used as an inert gas. By admixing the inert gas, the total sintering pressure can be increased to values of up to $10^7$ Pa.

In the later sintered compact, the used, very fine powders produce a very homogenous, finely interlocked, $Si_3N_4$-matrix sintered structure having a fine distribution of $MoSi_2$ in $Si_3N_4$. Furthermore, the powders used according to the present invention surprisingly result in the very high 4-point bending strengths.

The pin heater can be used as a ceramic sheathed-element glow plug.

DESCRIPTION OF THE EXEMPLARY EMBODIMENT

Example 1

Figure 1:
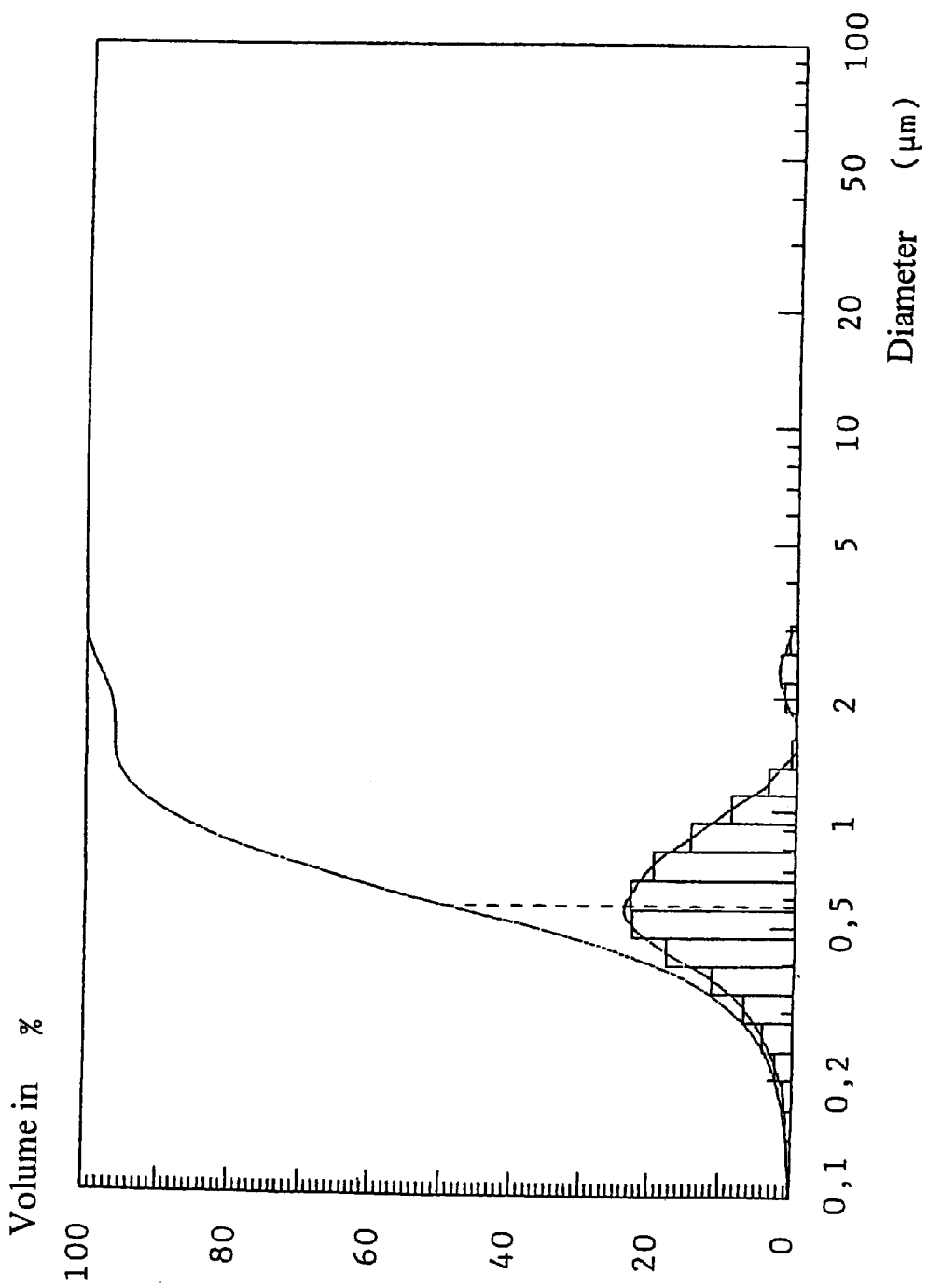
FIG. 1 shows the particle-size distribution of an $Si_3N_4$ powder which can be used according to the present invention. In this context, the particle-size distribution is very narrow, having an average grain diameter of 0.58 μm and a BET surface area of 11 m²/g.
Figure 2:
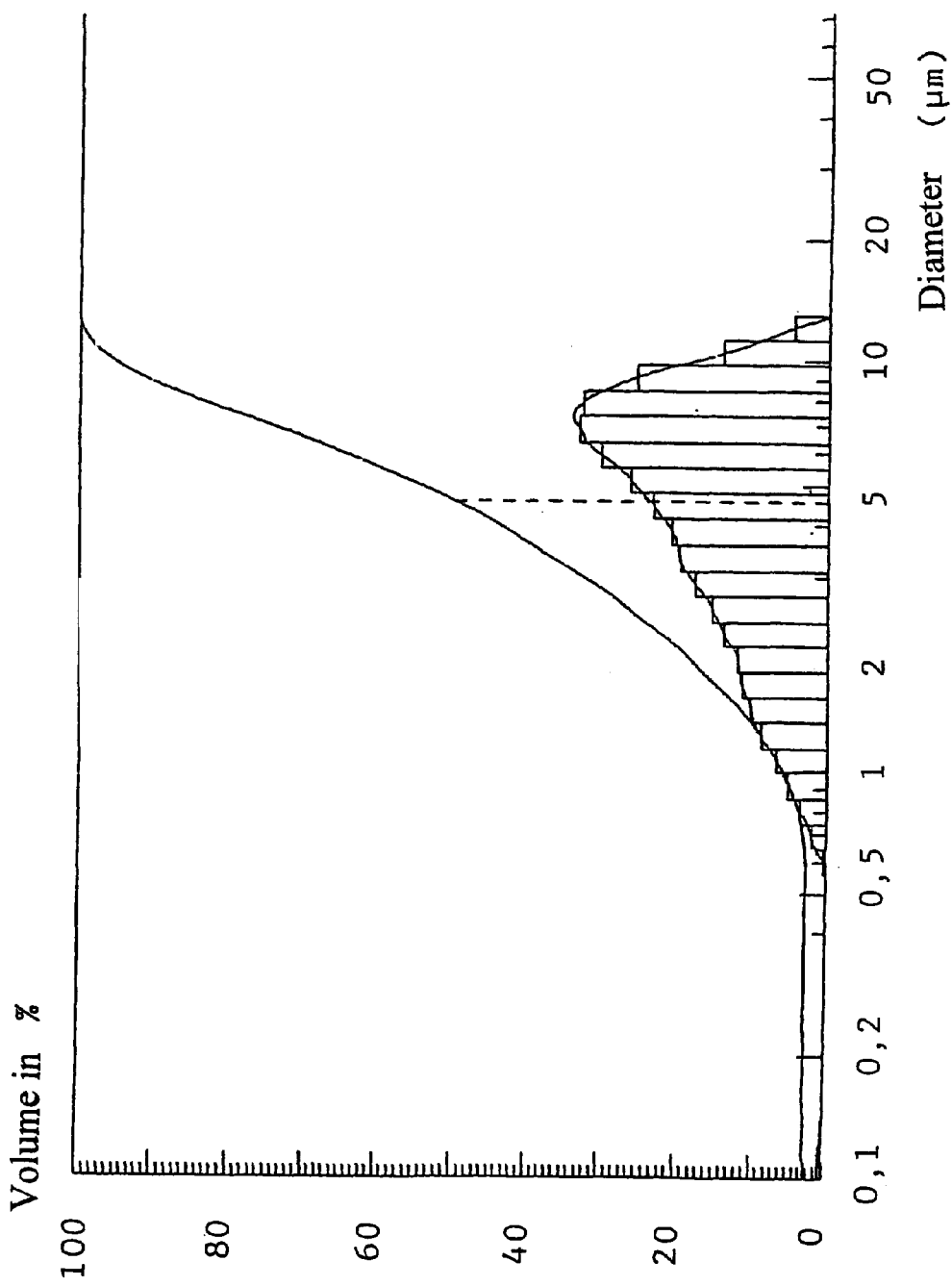
FIG. 2 shows the particle-size distribution of an $MoSi_2$ powder which can be used according to the present invention. The average grain diameter is 4.55 μm and the BET surface area is 1.1 m²/g.

The manufacture of the insulating composite component was prepared by mixing 54 mass percent of $Si_3N_4$, 2.58 mass percent of $Al_2O_3$, 3.42 mass percent of $Y_2O_3$, and 40 mass percent of $MoSi_2$. The silicon nitride used in the process had the particle-size distribution shown in FIG. 1, and the used molybdenum silicide powder had the particle-size distribution shown in FIG. 2. The manufacture of the conducting composite component was prepared by mixing 40.5 mass percent of $Si_3N_4$, 55 mass percent of $MoSi_2$, 1.94 mass percent of $Al_2O_3$, and 2.56 mass percent of $Y_2O_3$. The morphological properties of the two composite components were identical.

Figure 3:
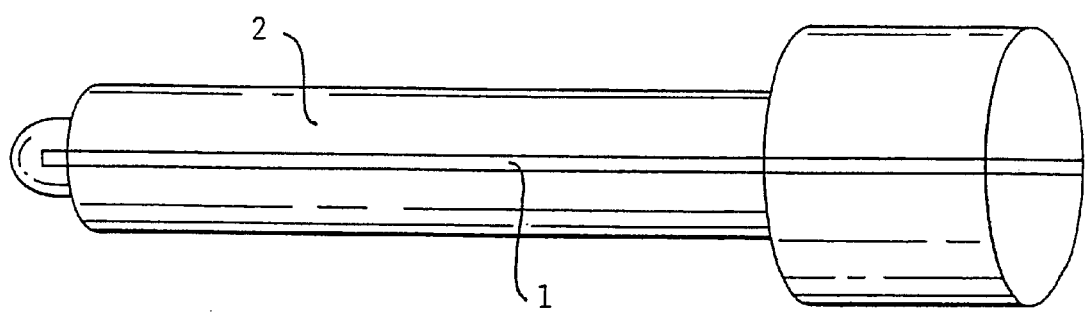
FIG. 3 shows an oblique side view of a ceramic heating element in the form of a sintered pin heater. The pin heater has an external conducting layer 2 composed of the conducting component and an essentially enclosed insulating layer 1 composed of the insulating component.

Injection-moldable polymer compounds were manufactured from each of the two composite components; the polymer compound that has insulating material after sintering containing 12 mass percent of Polybond® 1001, and the polymer compound that has conducting material after sintering containing 12.5 mass percent of Polybond® 1001. Polybond® 1001 is a homopolypropylene grafted with 6% of acrylic acid (manufacturer: Uniroyal Chemical). The polymer compounds further contained 6 mass percent of cyclododecane. The components were kneaded under protective gas at 180° C. Subsequently, granulation was carried out by cooling while the kneading machine was running. The pin heater shown in FIG. 3 was formed by two-component injection molding. Subsequently, the injection-molded object was compacted by a gas-pressure sintering method in the above-described manner.

The conductivity of external conducting layer 2 made of $Si_3N_4/MoSi_2$ composite was $2.2 \cdot 10^{-3}$ Ωcm; that of essentially enclosed insulating layer 1, which is likewise composed of an $Si_3N_4/MoSi_2$ composite, was $1 \cdot 10^6$ Ωcm.

Example 2

The manufacture of the insulating composite component was prepared by mixing 57 mass percent of $Si_3N_4$, 2.6 mass percent of $Al_2O_3$, 3.5 mass percent of $Y_2O_3$, and 37 mass percent of $MoSi_2$. The silicon nitride used in the process and the molybdenum silicide powder were identical to those from example 1. The manufacture of the conducting composite component was prepared by mixing 38 mass percent of $Si_3N_4$, 57.8 mass percent of $MoSi_2$, 1.8 mass percent of $Al_2O_3$, and 2.4 mass percent of $Y_2O_3$. The respective composite components, which were preconditioned by grinding in a mixing manner, were granulated with suitable auxiliary pressing agents, such as polyvinyl alcohol, in order to manufacture pressable powders. The pin heaters shown in FIG. 3 were formed by composite pressing, including subsequent green processing. The compaction was carried out analogously to example 1.

The 4-point bending strength at room temperature was 640 MPa±20 MPa for the insulating component, and 600 MPa±25 MPa for the conducting component.

What is claimed is:

1. A sintered pin heater, comprising:
  a ceramic composite structure;
  an essentially enclosed insulating layer; and
  an external conducting layer, wherein a composition of the insulating layer corresponds to:
    51–57 mass percent of $Si_3N_4$,
    37–42 mass percent of $MoSi_2$,
    2.4–2.8 mass percent of $Al_2O_3$, and
    3.2–3.6 mass percent of $Y_2O_3$, and wherein a composition of the conducting layer corresponds to:
    38–42 mass percent of $Si_3N_4$,
    53–58 mass percent of $MoSi_2$,
    1.8–2.0 mass percent of $Al_2O_3$, and
    2.4–2.7 mass percent of $Y_2O_3$.

2. The pin heater according to claim 1, wherein the composition of the insulating layer corresponds to:
    51–57 mass percent of $Si_3N_4$ with $d_{50}$ being less than 0.7 μm,
    37–42 mass percent of $MoSi_2$ with $d_{50}$ being 2–5 μm,
    2.4–2.8 mass percent of $Al_2O_3$ with $d_{50}$ being 0.2–0.3 μm, and
    3.2–3.6 mass percent of $Y_2O_3$ with $d_{50}$ being 0.5–1.0 μm, and wherein the composition of the conducting layer corresponds to:
    38–42 mass percent of $Si_3N_4$ with $d_{50}$ being less than 0.7 μm, 53–58 mass percent of $MoSi_2$ with $d_{50}$ being 2–5 μm, 1.8–2.0 mass percent of $Al_2O_3$ with $d_{50}$ being 0.2–0.3 μm, and 2.4–2.7 mass percent of $Y_2O_3$ with $d_{50}$ being 0.5–1.0 μm.

3. The pin heater according to claim 1, wherein the pin heater is produced according to a process involving:

performing a first sintering under an inert gas, and performing at least a second sintering under a nitrogen partial pressure of $2–10·10^5$ Pa, wherein:
a temperature of the first sintering is lower than a temperature of the at least second sintering.

4. The pin heater according to claim 3, wherein;

a maximum of the temperature of the first sintering is 900° C., and the first sintering is performed at atmospheric pressure.

5. The pin heater according to claim 3, wherein:

a temperature of the at least second sintering is between 1700 and 1900° C.

6. The pin heater according to claim 3, wherein:

the at least second sintering is performed in accordance with at least one of variable temperatures and variable nitrogen partial pressures such that the ceramic composite structure contains pure phases of the insulating layer and of the conducting layer.

7. The pin heater according to claim 6, wherein:

at least one of the first sintering and the at least second sintering is performed in a range of one of the variable nitrogen partial pressures having an upper limit $Y_1$ and a lower limit $Y_2$, the upper limit $Y_1$ and the lower limit $Y_2$ are expressed according to the following functions:

$$Y_1 = \log p(N_2) = 7.1566 \ln(T) - 52.719,$$

and $$Y_2 = \log p(N_2) = 9.8279 \ln(T) - 73.988,$$

T corresponds to a sintering temperature of $\leq 1900°$ C., and p ($N_2$) corresponds to an input denoted in units of bar.

* * * * *